United States Patent [19]
Hamilton et al.

[11] Patent Number: 5,561,654
[45] Date of Patent: Oct. 1, 1996

[54] COMPACT WRITE SYSTEM FOR OPTICAL TAPE RECORDING

[75] Inventors: Scott M. Hamilton, Rockwall; Billy C. Frederick, Rowlett; Rodney C. Hibner, II, Allen, all of Tex.

[73] Assignee: E-Systems, Inc., Dallas, Tex.

[21] Appl. No.: 476,838

[22] Filed: Jun. 7, 1995

[51] Int. Cl.$^6$ .................................................. G11B 3/74
[52] U.S. Cl. ........................................ 369/97; 369/60
[58] Field of Search ............................... 369/47, 48, 49, 369/50, 54, 58, 60, 97, 93, 95, 96, 99, 124, 112

[56] References Cited

U.S. PATENT DOCUMENTS

| | | | |
|---|---|---|---|
| 4,633,455 | 12/1986 | Hudson | 369/112 |
| 4,743,091 | 5/1988 | Gelbart | 369/112 |
| 4,815,067 | 3/1989 | Webster et al. | 369/97 |
| 4,939,715 | 7/1990 | Vogelgesang et al. | 369/97 X |
| 5,081,617 | 1/1992 | Gelbart . | |
| 5,177,724 | 1/1993 | Gelhart | 369/44.37 |
| 5,245,174 | 9/1993 | Prikryl et al. . | |

OTHER PUBLICATIONS

Optical Recording, A Technical Overview by Alan B. Marchant, Addison–Wesley Publishing Co.

*Primary Examiner*—Georgia Y. Epps
*Assistant Examiner*—P. W. Huber
*Attorney, Agent, or Firm*—Harold E. Meier

[57] ABSTRACT

A write module for an optical tape recorder for optically writing a data signal on light sensitive recording media. The write module comprises a rotated linear edge emitter diode array or vertical cavity emitter diode array comprising a plurality of emitter diodes. The diodes emit a plurality of write beams for writing the data signal on the recording media in a plurality of data channels. An actuator subsystem focuses and positions the write beams on the recording media. The rotation angle of the diode array is a predetermined angle to provide a predetermined separation distance between adjacent data channels. Each write beam is modulated by a designated portion of the data signal to generate a plurality of data signal modulated write beams to optically record the data on the recording media. The data signal modulating each write beam is delayed by a predetermined time value for writing a word of the data signal in adjacent data marks along a line transverse to the length of the data channels.

12 Claims, 4 Drawing Sheets

COMPACT WRITE SYSTEM FOR OPTICAL TAPE RECORDING

TECHNICAL FIELD

The present invention relates to optical tape recorders and, in particular, to a compact write system providing high data rates by simultaneously recording parallel data channels closely proximated to one another on the optical media.

BACKGROUND OF THE INVENTION

Optical systems are now commonly used in place of magnetic systems for recording and retrieval of digitized information. In optical recorders, the data is used to digitally modulate a light beam having a predetermined intensity necessary to mark a light sensitive recording media. The modulated beam is focused to a small spot and traced across the media to record the data as a fine optical pattern comprised of a number of closely spaced, microscopic dots (data marks) along a data track. A data track may contain a plurality of data channels depending on the number of write beams. To recover the recorded data from the optical media, a low intensity illumination beam is scanned along the data track and modulated by the optical pattern recorded therein. The modulated beam is reflected from the media to illuminate a light detector producing an electrical signal in accordance with the beam modulation for recovery of the recorded data.

Increased delta rates require retrieval (or recordal) of multiple data channels simultaneously and/or increased scanning velocities. Difficulties arise when attempting to achieve both effectively in a compact opto-mechanical volume. While a single beam device may be provided in a compact volume, higher data rates require additional laser power and complex, high velocity scanners. Such systems include rotational scanners in disk systems, transverse scanners in certain lens systems, transverse linear air bearing scanners land acousto-optic scanners. The problem with such scanning systems is the cost and complexity in the scanning optics and mechanics.

Use of multiple write beams can reduce the need for complex scanning optics and mechanics. However, the disadvantage of present multiple write beam architecture is that it increases the volume (size) of the write head. At least two alternatives exist for introducing multiple write beams. One way is to use a number of discrete collimated laser diodes and spatially combine the outputs for focusing on the recording media by a final objective lens. The separation between each data channel is dictated by the angles of the beams as they enter the final objective lens, Since the objective lens has a limited field of view, the smaller the angles, the more compact the write head can be constructed. Smaller angles can be achieved through intervening optics to reduce the incoming angles, thus decreasing the separation between data channels (and increasing data density). However, this produces a system that is more complex and costly.

Another way is to use a single high-powered laser diode and a spatial light modulator to provide multiple distinct data beams. The problems with this type of system include laser power requirements (the number of parallel data channels is limited by both the field of view of the objective lens and the available laser diode power), channel intensity variations due to spatially sampling different portions of a laser beam with a Gaussian profile and increase complexity introduced by the spatial light modulator.

Accordingly, there is a need for a system incorporating multiple write beams to increase the aggregate data rate without significantly increasing the size of the write head and without complex scanning optics and mechanisms (e.g. lens wheel, linear air bearing, acousto-optic scanner). A system is needed that can reduce or eliminate external modulation requirements (spatial light modulator) and precision optomechanics required for diode-to-diode pointing. Furthermore, in longitudinal systems (data recorded longitudinally on the optical tape) where the write pulse length is sufficiently long such that thermal effects at the recording media between adjacent data channels affect the recorded data mark size, it is advantageous to maximize the spatial distance between two adjacent focused data mark spots to minimize thermal adjacency effects while still providing short separation of the data channels. Additionally, a system is needed having a write head that is simple, compact and low in cost.

SUMMARY OF THE INVENTION

A write module for an optical tape recorder for optically writing a data signal on light sensitive recording media comprises a rotated linear edge emitter diode array comprising a plurality of emitter diodes emitting a plurality of write beams for writing the data signal on the recording media in a plurality of data channels. A mechanism is provided for focusing and positioning the write beams on the recording media. The rotation angle of the diode array is rotated by a predetermined angle to provide a predetermined separation distance between adjacent data channels. Each write beam is modulated by a designated portion of the data signal to generate a plurality of data signal modulated write beams to optically record the data on the recording media. Further, a plurality of time delays are generated and incorporated into selected designated portions of the data signal for writing a word of the data signal in adjacent data marks along a line transverse to the length of the data channels.

BRIEF DESCRIPTION OF THE DRAWINGS

A more complete understanding of the optical tape recorder of the present invention may be had by reference to the following detailed description in conjunction with the accompanying drawings wherein.

DETAILED DESCRIPTION OF THE DRAWINGS

Figure 1:
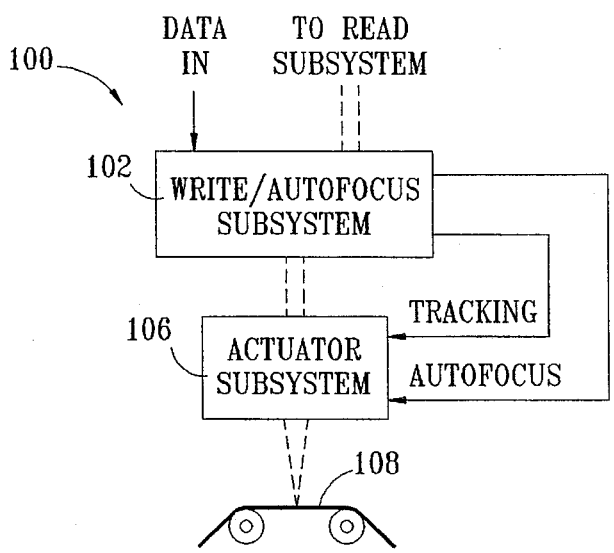
FIG. 1 illustrates an optical tape recorder system using the write system according to the present invention.

Referring now to FIG. 1, there is shown a block diagram of a write system 100 of an optical tape recorder according to the present invention. The write system 100 comprises a write/autofocus subsystem 102 outputting an multi-beam illumination beam 104 and an actuator subsystem 106 for focusing and positioning the multi-beam illumination beam on light sensitive recording media 108. The multi-beam illumination beam 104 may include either or both a write beam and a read beam. The multi-beam illumination beam. 104 may also include other beams, such as an autofocus beam, combined with the read and write beam as needed to perform the desired functions of the optical tape recorder. As will be discussed below, the write/autofocus subsystem 102 includes light sources and optics (see FIG. 2) for generating and combining the included multi-channel write and autofocus beams into the multi-beam illumination beam 104. Additionally, actuator subsystem 106 includes optics, actuator mechanisms and electronics for focusing and positioning the multi-beam illumination beam 104 onto recording media 108.

The present optical storage devices for which the write/autofocus subsystem 102 is designed includes multiple write beams that are focused and scanned across the recording media to record the data as a fine optical pattern, commonly referred to as a data track, comprised of multiple channels of closely spaced, microscopic dots (data marks). A data track may contain any number of data channels depending on the number of write beams. The write system of the present invention outputs a multi-beam illumination beam 104 having a plurality of write beams combined together. This illumination beam 104 is focused and positioned on the recording media 108 by the actuator subsystem 106 and scanned across the recording media 108 through movement of the recording media 108 (in the −x or +x direction) to record the data in a fine optical pattern (data track) comprised of multiple data channels of closely spaced, microscopic dots (data marks) as will be described in more detail with reference to FIGS. 4A, 4B and 4C.

Figure 2:
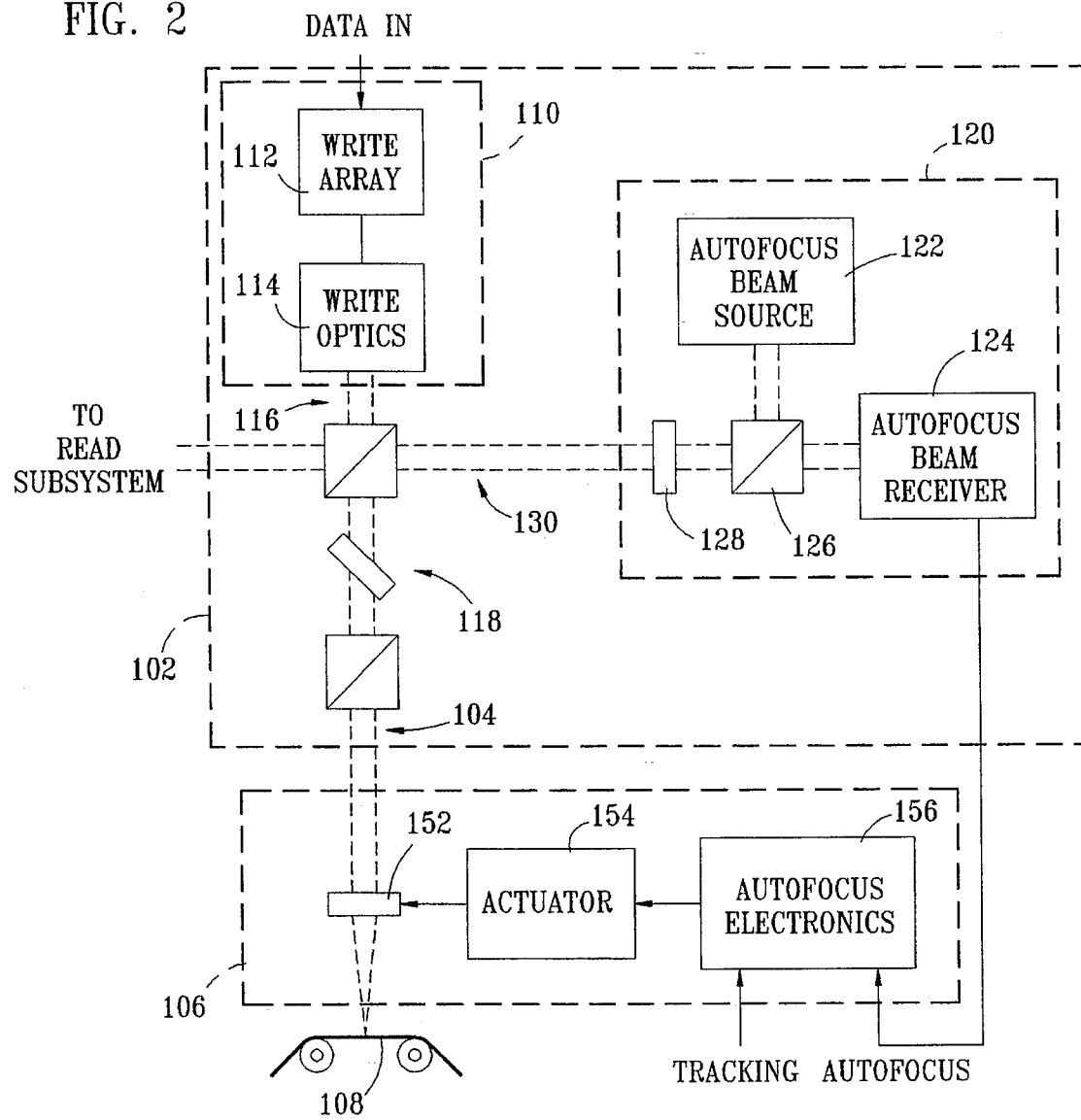
FIG. 2 is a block diagram of the write system for the optical tape recorder of FIG. 1 showing the write array, autofocus system, and associated optics, including optics coupling a read subsystem into the optical tape recorder system.

Referring now to FIG. 2, the multi-beam illumination beam 104 output by the write/autofocus subsystem 102 is directed toward the actuator subsystem 106 comprised of an objective lens 152, an actuator 154 and autofocus electronics 156. The objective lens 152, the actuator 154 and the autofocus electronics 156 of the actuator subsystem 106 function to accurately focus the multi-beam illumination beam 104 on the recording media 108 to provide the writing of a multiple data channel data track.

The objective lens 152 is mounted to the actuator 154 and is controlled longitudinally (in response to the autofocus signal) and laterally (for read/tracking purposes) with the actuator 154.

The multi-beam illumination beam 104 output by the write/autofocus subsystem 102 comprises a plurality of spatially combined beams, including a collimated multi-channel write beam 116 and a collimated autofocus beam 130. The write beam 116 is generated by a write system 110. The autofocus beam 130 is generated by an autofocus system 120. Both beams, the multi-channel write beam 116 and the autofocus beam 130, are combined together by combining optics 118 into the multi-beam illumination beam 104. The autofocus beam 130 is optional and will be discussed later.

Figure 3:
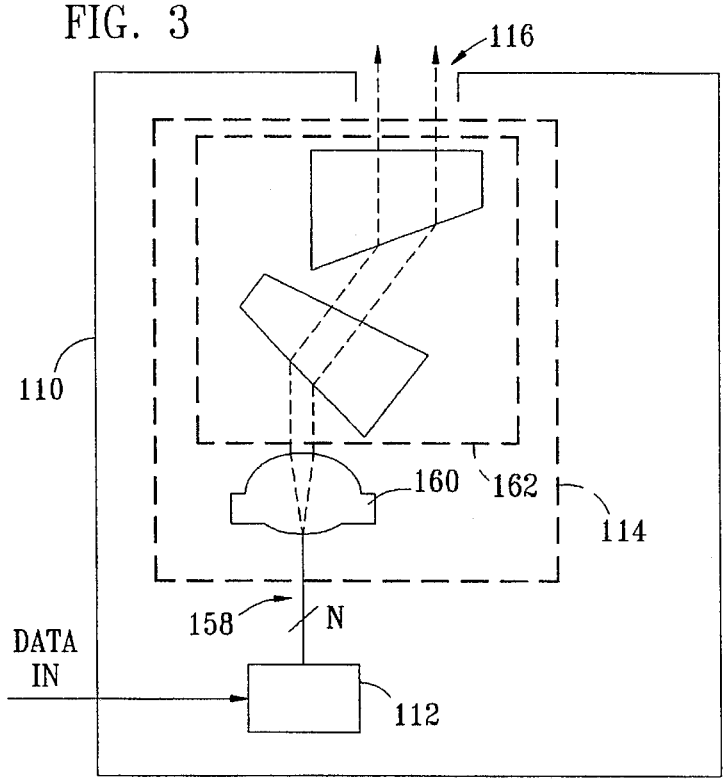
FIG. 3 is a diagram of the write subsystem shown in FIG. 2 showing the write array and write optics.

With reference to FIGS. 2 and 3, the write system 110 includes a write array 112 and write optics 114 which function to produce a multi-channel write beam 116. The write array 112 outputs a plurality of individual write beams 158 (see FIG. 3). The write optics 114 transform the write beams 158 into the collimated multi-channel write beam 116. A lens 160 and a prism pair 162 (or equivalent, e.g. a cylindrical lens combination) of the write optics 114 collimate and circularize the write beams 158 to generate the collimated multi-channel write beam 116 (having a plurality of write beams).

Figure 4A:
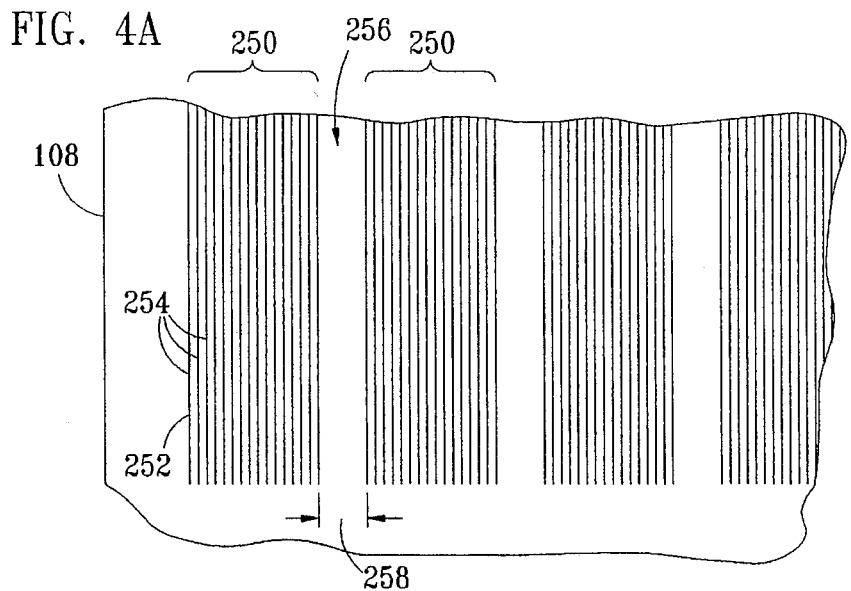
FIG. 4A illustrates a partial view of the recording media showing data tracks, data channels, data marks and the layout of the read illumination beam at the surface of the recording media.

With further reference to FIG. 4A, there is illustrated a piece of recording media 108 having a plurality of data tracks 250. Each data track 250 is comprised of N channels of recorded data. Each channel of data is recorded: on the recording media 108 as a data channel 252 within the data track 250. The number of data channels N depends on the number of write beams in the multi-beam illumination beam 104. In the preferred embodiment, there are sixteen data channels 252 within a data track 250.

Figure 4B:
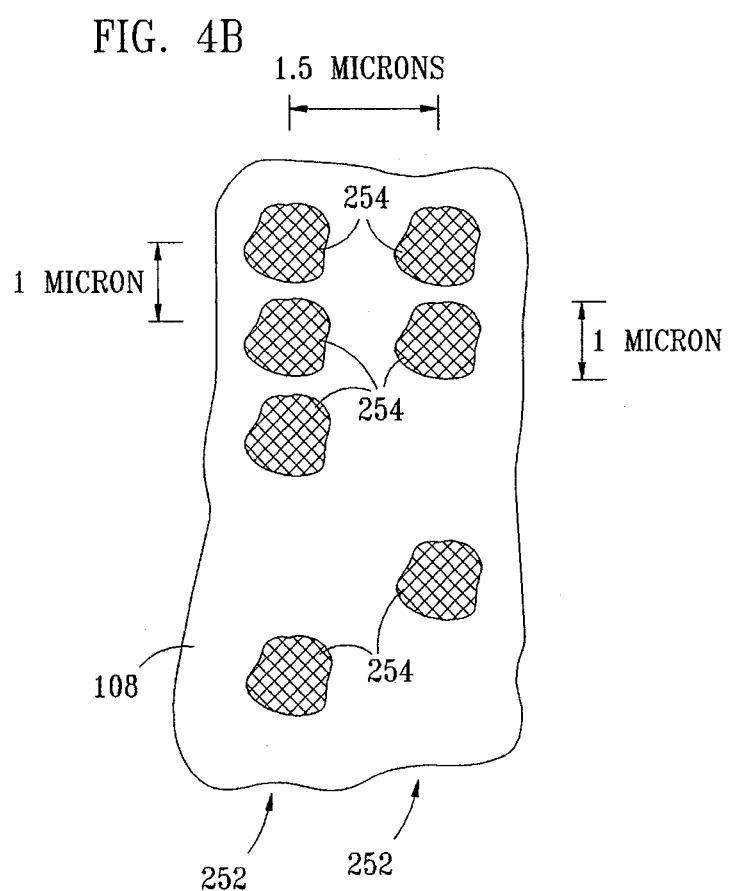
FIG. 4B illustrates the spacing between adjacent data channels in the data track and the minimum mark size in each data channel for pulse position modulation (PPM) with the distance between adjacent data marks in each data channel being determined by the encoding scheme; likewise, for pulse width modulation (PWM), the length of each data mark is determined by the encoding scheme.

With additional reference to FIG. 4B, there is illustrated a piece of recording media 108, specifically a portion of a data track 250 as shown in FIG. 4A, illustrating the marking of the light sensitive media by the multiple write beams of the multi-beam illumination beam 104. Portions of two data channels 252 within a data track 250 are shown. The spacing (or channel pitch) between the centers of the adjacent data channels 252 in a data track 250 is typically about one and a half microns and may vary depending on the optics used to record the data marks on the recording media 108. The spacing between the adjacent data marks 254 in the along track direction depends on the encoding scheme. Further, the length of each data mark 254 in the along track direction may vary depending on if a pulse width modulation (PWM) encoding scheme is used. Typically, for pulse position modulation (PPM) the length of the data mark is about one micron, depending on the writing wavelength and NA. While the spacing between the adjacent data channels 252 and the adjacent data marks 254 set forth above is preferred, other dimensions for this spacing can be used.

Figure 5:
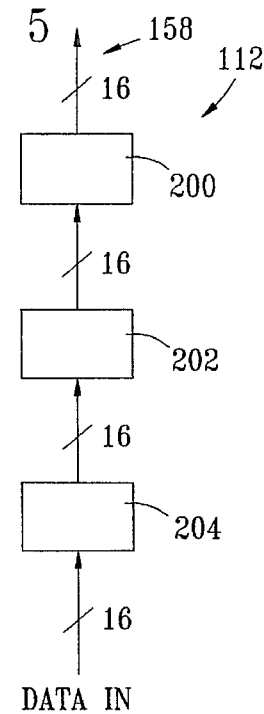
FIG. 5 is a block diagram of the write array shown in FIGS. 2 and 3 illustrating the laser diode array, the coarse delay module and the fine delay module.

With reference to FIGS. 3 and 5, write array 112 includes a laser diode array 200 comprising a plurality of laser diodes each producing a write beam 158. In the preferred embodiment, the laser diode array 200 is a sixteen-element monolithic laser diode array (with each element called an emitter or laser diode). Any number of diodes can be used in the array depending on the number of write beams desired. The plurality of laser diodes of the laser diode array 200 output light of a predetermined polarization and wavelength into a plurality of write beams 158.

Preferably, the laser diode array 200 comprises linear edge emitter diodes, but may comprise vertical cavity surface emitter diodes or some other type of laser diodes suitable for the purpose of the present invention. Alternatively, discrete laser diodes may be used instead of the laser diode array. If so, additional optics may be necessary to orient each write beam 158 with respect to the other write beams into the multi-channel write beam 116.

Additionally, the laser diode array 200 may contain one or more redundant laser diodes to generate one or more redundant write beams writing a data channel. Such a redundancy scheme allows switching to this extra laser diode (and corresponding write beam) in case of a failure of one of the original N (in the preferred embodiment, sixteen) laser diodes.

Figure 4C:
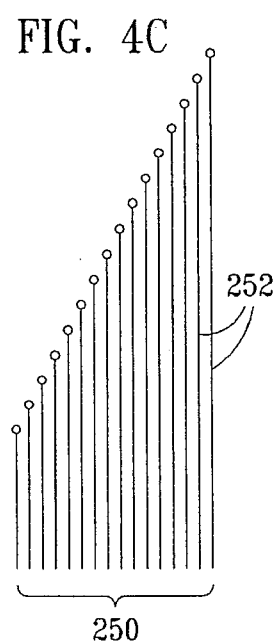
FIG. 4C illustrates the multi-channel write beam pattern as applied to the recording media.

The laser diode array 200 is oriented such that the junction, and hence the linear polarization of any of the write beams 158 output by the emitters, is in the x-direction. The emitter pitch (separation distance between each individual emitted write beams 158) of the laser diode array in the preferred embodiment is about fourteen (14) microns (but not restricted to). The write optics 114 (along with the objective lens 152) demagnify the emitter separation to about 2.6 microns at the plane of the recording media 108. Therefore, in order to provide about 1.5 micron separation between data channels on the recording media 108, the entire write system 110 is rotated about 35 degrees, the rotation angle. The pattern of the multi-channel write beam 116 as applied to the recording media 108 is shown in FIG. 4C. As will be appreciated, the rotation angle depends on characteristics and parameters of the desired write system.

The data channel pitch (separation of data channels) is dictated by the angles of the collimated write beams entering the objective lens and the focal length. Since the objective lens inherently has a limited field of view, the incoming angles cannot be too large. As such, the smaller the incoming angles, the more compact the write head can be constructed. To this end, writing sixteen data channels with a data channel separation of preferably 1.5 micron can be provided in a compact write head by rotating the write beams angularly with respect to the length of the data channels. This effectively produces a channel pitch of about 1.5 microns at the tape plane and a pitch between write beams of about 2.6 microns at the tape plane when a rotation angle of about 35° is used. Accordingly, the write head may be more compact. As will be appreciated, the rotation angle of the present invention is not limited to 35°.

To simplify the reading process, it is desirable to write all of the information for a word in adjacent data marks on the recording media. To accomplish this with a rotated laser array (producing a multi-channel write beam pattern as shown in FIG. 4C), each of the data channels is delayed by an amount to align the marks on the recording media 108. Therefore, each data line of the DATA IN signal (16 parallel lines) is delayed by the appropriate amount. With reference to FIG. 5, the write array 112 further includes a "fine" delay module 202 and a "coarse" delay module 204 for providing the proper delay for each data line of the DATA IN signal. The coarse delay module 202 uses a programmable controller and a first-in-first-out memory to provide the appropriate delay to align the data marks to within a clock cycle. The fine delay module 204 performs a sub-clock alignment using programmable delay lines.

For illustration purposes only, the rotation angle (A) of the write system 110 is dependent on the individual write beam spacing in the plane of the recording media 108 (L1) and the desired distance between the data channels 252 (L2). The relationship is given by the equation: $A=\mathrm{acos}(L2/L1)$. The distance (L3) between individual write beams in the data channel direction is given by the equation: $L3=(L1)\mathrm{sin}A$. The time delay (T) between adjacent write beams crossing a given cross data channel line on the recording media depends upon the recording media velocity (V) and is given by the equation: $T=L3/V$. For a sixteen element laser diode array, the coarse delay 204 accommodates a maximum delay (D) from the first write beam to the last write beam as given by the equation: $D=T\times 15$. The number of clock periods for the coarse delay (CD) depends upon the system clock period (CP) and is given by the equation: $CD=\mathrm{int}(D/CP)$. In the preferred embodiment, the desired distance between the data channels 252 (L1) (at the media plane) is about 1.5 microns. As will be understood, the rotation angle can be any rotation angle to produce the desired results and the above computations are used only for illustrative purposes. Other computation methods, time delays and other rotation angles may be used.

Referring now to FIGS. 2, 3, 4A and 4B, data is recorded on the media 108 by modulating the write beams 158 output by the write array 112 by the write system 110. Each write beam 158 is digitally modulated (on/off) by the DATA IN signal (shown in FIG. 3), carrying a data signal to be recorded. The amplitude of a data pulse is dictated by the pulse width and the sensitivity of the recording media (i.e. the energy required to write the desired data mark size). The plurality of write beams are combined by the write optics 114 to form the collimated multi-channel write beam 116 within the multi-beam illumination beam 104 and focused on the media by the actuator subsystem 106 to scan multiple channels 252 within each data track 250 as the recording media 108 is travelling in the forward or reverse direction (+x or −x). Movement of the actuator subsystem 106 perpendicular to the movement of the tape allows a plurality of data tracks 250 to be recorded adjacent to one another on the recording media 108 (shown in FIG. 4A).

Alternatively, the plurality of write beams output by the write array 112 are demagnified by the write optics 114 to provide the desired spacing (about 1.5 microns at the plane of the recording media 108) between each write beam of the multi-channel write beam 116 whereby each write beam is adjacent one another. This would eliminate the need for rotation of the write system 110. Further, this would dispense with the coarse delay and fine delay modules. However, depending on system parameters (pulse width, transport speed, available write power) this may not be an advantage due to thermal crosstalk at the recording media 108.

Figure 6:
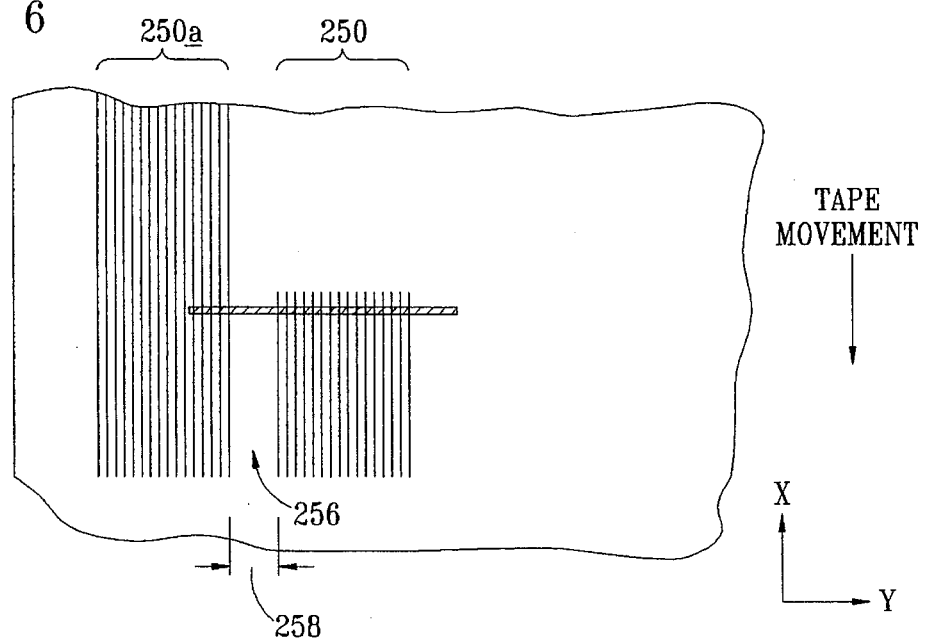
FIG. 6 illustrates a read-after-write function at the surface of the recording media.

Referring now to FIG. 6, there is illustrated a read-after-write function provided by the optical tape recorder system. Tracking information obtained from a read/tracking system (not shown) controls the objective lens 152 transversely via the actuator subsystem 106 to maintain the guardband distance 258 at the desired guardband distance of approximately 4.5 microns. As such, the read/tracking system (not shown) insures the desired guardband distance between adjacent data track 250a and data track 250. As the write is performed and the guardband decreases or enlarges, the read/tracking system sends a TRACKING signal to the actuator system 106 to make the proper positional adjustments to the objective lens 152 causing adjacent data tracks to be written in close proximity.

Figure 7:
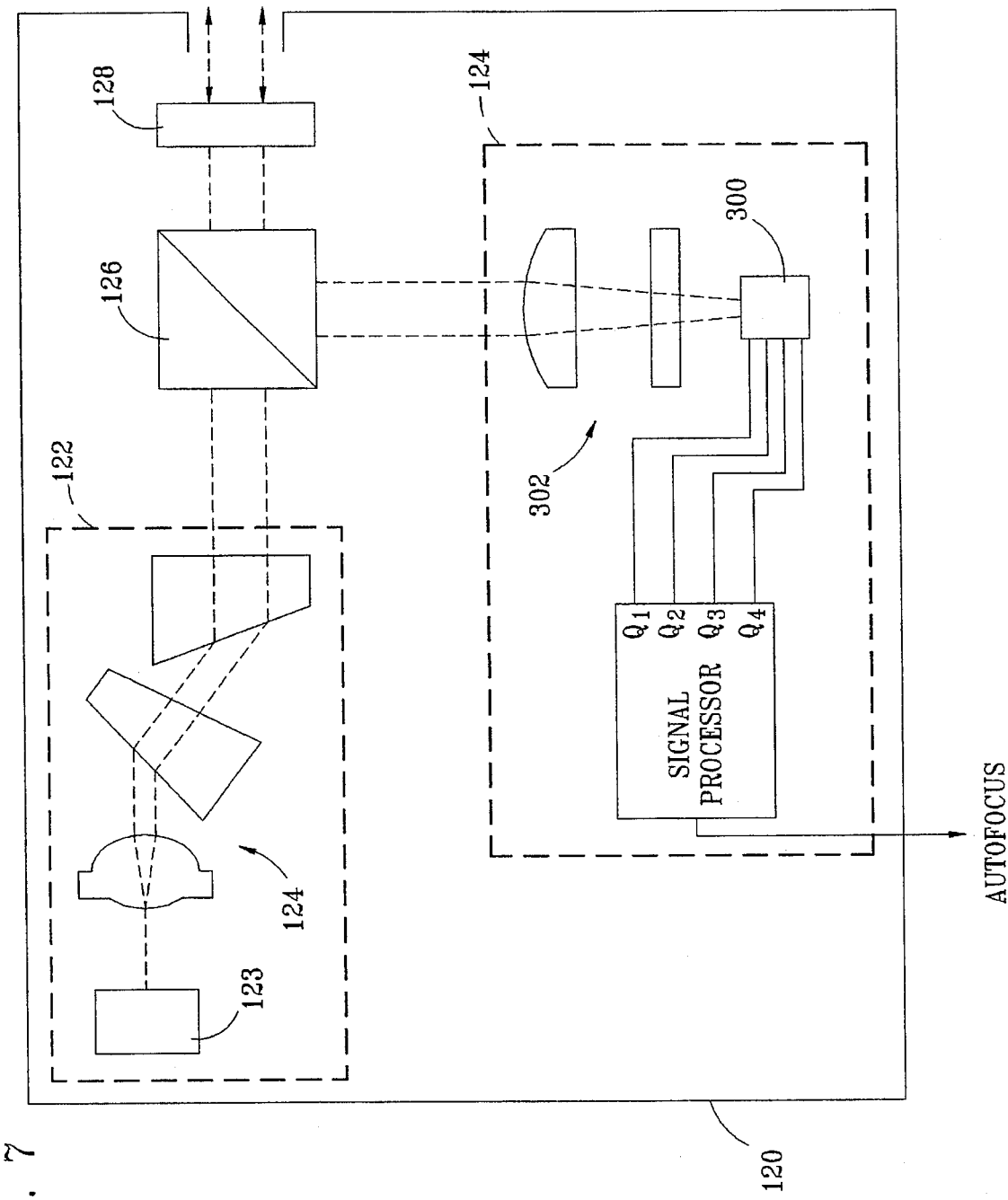
FIG. 7 is a diagram of one embodiment of the autofocus system shown in FIG. 2 showing the autofocus beam source, autofocus beam receiver, and associated optics to detect focusing errors in the optical tape recorder and generate an autofocus signal.

Referring now to FIG. 7 and with continued reference to FIG. 2, the autofocus system 120 includes an autofocus beam source 122 (similar to write array and write optics shown in FIG. 3) for outputting a collimated autofocus beam 130. The autofocus beam 130 is reflected through the beamsplitter 126 and is passed through a quarter-wave plate 128 to change the polarization of the autofocus beam from linear to circular. The autofocus beam 130 is combined with multi-channel write beam 116 by combining optics 118 into the multi-beam illumination beam 104. The autofocus beam 130 is directed by the objective lens 152 of the actuator subsystem 106 onto the recording media 108.

The autofocus beam 130 is reflected by the surface of the media 108 back through the objective lens 152 to the autofocus system 120. As shown, the polarization of the reflected autofocus beam 130 is changed by the quarter-wave plate 128 from circular to a linear polarization orthogonal to the original linear polarization (from p- to s-polarization). The reflected autofocus beam 130 is then transmitted by the polarization beamsplitter 126 and directed to the autofocus beam receiver 124.

Referring now to FIG. 7, the autofocus beam 130 generated by the autofocus beam source 122 is emitted from a single discrete diode 123 and may have the same wavelength as the plurality of write beams 116. The autofocus beam source 122 further includes lens optics 124 that is similar to the write optics 114 (having the lens 160 and 162) of the write system 110 (shown in FIG. 3). Alternatively, the source for the autofocus beam 130 may be incorporated into the write system 110 whereby the autofocus beam is generated by another emitter diode in the laser diode array 200 of the write array 112 (see FIG. 5). That is, the laser diode array will now contain seventeen laser diodes, sixteen for generating the sixteen write beams and one for generating the autofocus beam. In such embodiment, the autofocus beam can be modulated at lower frequencies (preferably KHz) as compared to the modulation frequencies (MHz) of the write beams (as dictated by the modulation and encoding process for writing data). As such, a filter may be required to remove the high frequency modulation from the reflected write data.

The reflected autofocus beam 130 is focused to a spot on a quadrant detector 300 by an astigmatic lens system 302. The quadrant detector 300 produces a plurality of electrical signals in accordance with the shape of the spot focused thereon by the astigmatic lens system 302. Variations in the shape of the focus spot detected by the quadrant detector 300 is used for a variety of feedback functions, including determining the focus of the multi-beam illumination beam 104 on the recording media 108. This autofocus technique is one of many common techniques that could be utilized. Another possible technique used can be the half-aperture technique.

Although several embodiments of the optical tape recorder of the present invention have been described in the foregoing detailed description and illustrated in the accompanying drawings, it will be understood that the invention is not limited to the embodiments disclosed, but is capable of numerous rearrangements, substitutions and modifications without departing from the spirit of the invention.

What is claimed is:

1. An apparatus for optically writing a data signal on light sensitive recording media comprising:

a linear edge emitter diode array comprising a plurality of linear edge emitter diodes emitting a plurality of write beams, said write beams of said diode array positioned by a selected angle to provide a predetermined separation distance between adjacent data channels;

means for modulating each write beam by a designated portion of the data signal to generate a plurality of data signal modulated write beams;

means for generating a plurality of time delays for selected designated portions of the data signal for writing a word of the data signal in adjacent data marks along a line transverse to the length of the data channels; and means for focusing and positioning the write beams on the recording media.

2. An apparatus in accordance with claim 1 wherein the diode array includes N linear edge emitter diodes emitting N write beams for writing N data channels.

3. An apparatus in accordance with claim 2 wherein the diode array further comprises an extra linear edge emitter diode for emitting a redundant write beam as a replacement when one of the N write beams fails.

4. An apparatus in accordance with claim 2 wherein the diode array further comprises an extra linear edge emitter diode for emitting a write beam for writing a data channel to provide clocking and tracking information.

5. An apparatus in accordance with claim 1 further comprising:

a discrete laser diode emitter emitting an autofocus beam at substantially the same wavelength as the write beams emitted from the diode array, said autofocus beam focused on the recording media and reflected thereby;

means for focusing the reflected autofocus beam to a spot;

detector means for detecting the shape of the focused spot; and means for determining from the detected shape of the focused spot when the autofocus beam is focused by the means for focusing and positioning on the recording media and generating an autofocus error signal indicative of any focus error.

6. An apparatus in accordance with claim 5 wherein the means for focusing and positioning comprises an objective lens that focuses the autofocus beam in response to the autofocus error signal.

7. An apparatus in accordance with claim 1 further comprising an autofocus module including means for emitting an autofocus beam and generating an autofocus signal indicative of whether the autofocus beam is focused on the recording media.

8. An apparatus for optically writing a data signal on light sensitive recording media comprising:

a linear edge emitter diode array comprising a plurality of linear edge emitter diodes emitting a plurality of write beams for writing the data signal on the recording media in a plurality of data channels and an autofocus beam directed to the recording media and reflected thereby, said write beams of said diode array positioned by a selected angle to provide a predetermined separation distance between adjacent data channels;

means for modulating each write beam by a designated portion of the data signal to generate a plurality of data signal modulated write beams;

means for modulating the autofocus beam at a frequency less than the frequency modulation of each write beam;

means for generating a plurality of time delays for selected designated portions of the data signal for writing a word of the data signal in adjacent data marks along a line substantially transverse to the length of the data channels; and an objective lens for focusing and positioning the write beams on the recording media.

9. An apparatus in accordance with claim 8 further comprising:

means for focusing the reflected autofocus beam to a spot;

detector means for detecting the shape of the focused spot; and means for determining from the detected shape of the focused spot whether the autofocus beam is properly focused by the objective lens on the recording media and generating an autofocus error signal indicative of a focus error.

10. An apparatus in accordance with claim 9 further comprising a filter for removing from the reflected autofocus beam any high frequency modulation signals from the reflected write beams.

11. An apparatus for optically writing a data signal on light sensitive recording media comprising:

a rotated vertical cavity surface emitter diode array comprising a plurality of vertical cavity surface emitter diodes emitting a plurality of write beams for writing the data signal on the recording media in a plurality of data channels, said rotated diode array being rotated by a predetermined angle to provide a predetermined separation distance between adjacent data channels;

means for modulating each write beam by a designated portion of the data signal to generate a plurality of data signal modulated write beams;

means for generating a plurality of time delays, said time delays incorporated into selected designated portions of the data signal for writing a word of the data signal in adjacent data marks along a line substantially transverse to the length of the data channels; and an actuator subsystem comprising an objective lens for focusing and positioning the write beams on the recording media.

12. An apparatus in accordance with claim 11 further comprising:

a discrete laser diode emitter emitting an autofocus beam about the same wavelength as the write beams emitted from the diode array, said autofocus beam focused on the recording media and reflected thereby;

means for focusing the reflected autofocus beam to a spot;

detector means for detecting the shape of the focused spot; and means for determining from the detected shape of the focused spot whether the autofocus beam is properly focused by the objective lens on the recording media and generating an autofocus error signal indicative of focus, wherein the actuator subsystem properly focuses the autofocus beam in response to the autofocus error signal by movement of the objective lens.

* * * * *